Oct. 14, 1952  H. PEARLMAN  2,613,712
PORTABLE VEGETABLE PEELING MACHINE
Filed June 9, 1949  3 Sheets-Sheet 1

INVENTOR.
Harry Pearlman
BY Robbey Cobb
Attorneys.

Patented Oct. 14, 1952

2,613,712

UNITED STATES PATENT OFFICE 2,613,712

PORTABLE VEGETABLE PEELING MACHINE

Harry Pearlman, Syracuse, N. Y.

Application June 9, 1949, Serial No. 98,045

3 Claims. (Cl. 146—49)

The present invention appertains to apparatus for peeling vegetables, and more especially to an improved portable peeling machine for peeling potatoes, onions, carrots, beets, turnips, parsnips, and other root vegetables.

The primary object of the invention is to provide a simple, sturdy, compact, efficient and economical peeling machine which may be made of appropriate size either for use in the home or for use in commercial establishments such as restaurants, hotels, and the like.

A further object of the invention is to provide a machine of the foregoing character which utilizes the principle of abrasion to effectively remove the skins or peelings from the vegetables quickly and with a minimum of waste, which is attained by the utilization of a rotary abrasive disc of special form which is arranged in the bottom of a receptacle in which the vegetables are adapted to be deposited, the receptacle also having a special shape for cooperation with the revolving disc so as to more effectively and efficiently agitate the vegetables during the peeling operation in such a manner that all of the vegetables will be peeled evenly and smoothly at approximately the same time, and without bruising or unduly flattening and hence wasting the vegetables.

A still further object of the invention is to provide a peeling machine which is so constructed and arranged as to be self-draining so as to facilitate the washing of the vegetables and removal of the peelings during the peeling operation.

Other and further objects and advantages of the invention will be hereinafter described and the novel features thereof defined in the appended claims.

Figure 1:
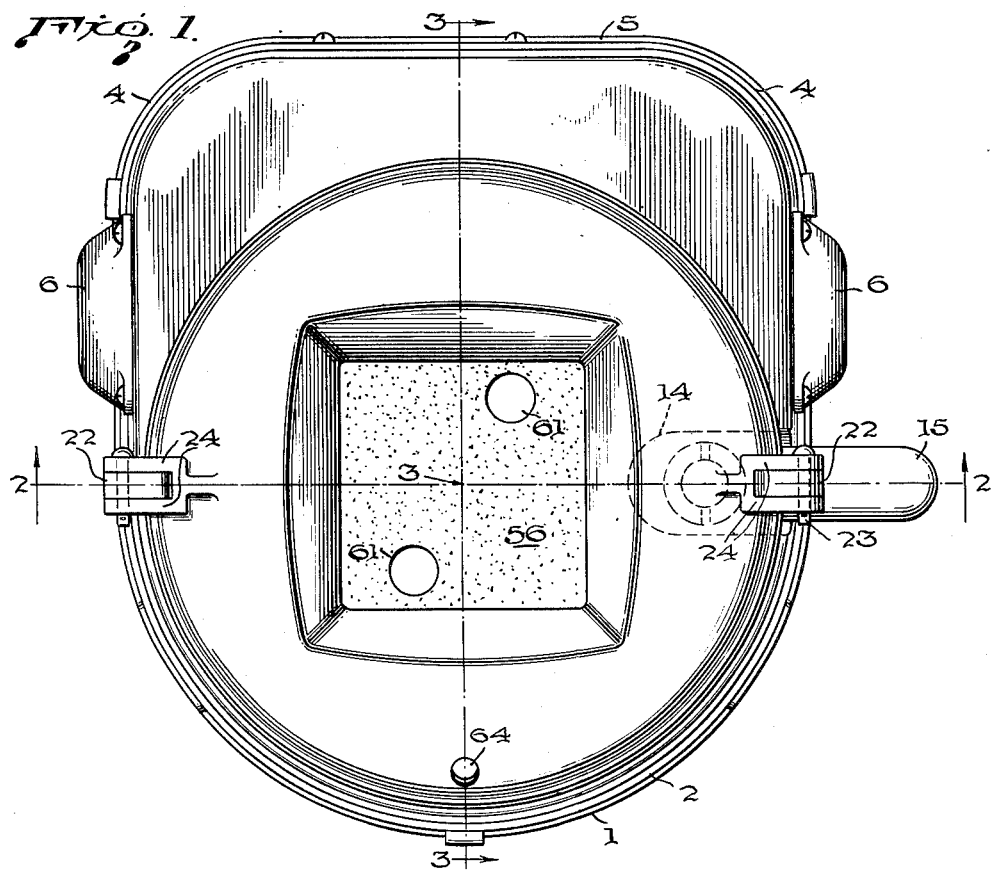
Figure 1 is a view in top plan of a vegetable peeling machine which is constructed in accordance with the present invention.
Figure 4:
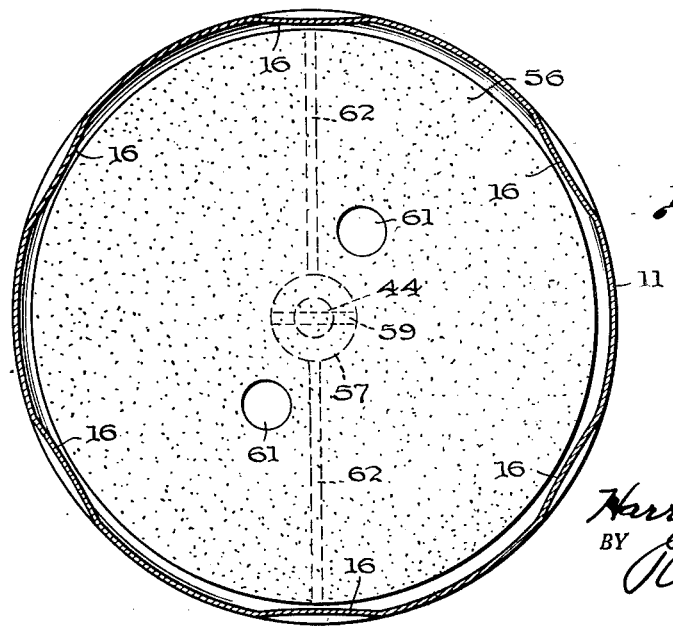
Figure 4 is a horizontal sectional view taken on the line 4—4 of Figure 2, looking in a downward direction.

Like reference characters designate corresponding parts in the several figures of the drawings, wherein 1 generally denotes the base of the machine which preferably has the form of a one-piece metal casting which is hollow so as to form a housing for the driving mechanism of the machine. As will be observed from the various figures of the drawings, one side of the base 1, which will be referred to as the front side, is curved in a more or less semi-circular form, on a radius having its center at 3, while beyond the center 3, the opposite sides of the base are substantially flat and are extended somewhat beyond the radius of the curved side 2 and merge by curved corners 4, 4 with a flat rear wall 5. Thus, the dimension of the base 1 from front to back is somewhat greater than the dimension from side to side. Lifting handles 6, 6 are suitably attached, as by means of screw fastenings 7, to the flat side walls 8, 8 at the center of balance of the completely assembled machine, as will hereinafter be more fully understood. Notches 9 or other appropriate openings are preferably provided at spaced intervals in the lower portion of the base 1 to permit air to freely circulate into and out of the interior of the base.

Figure 2:
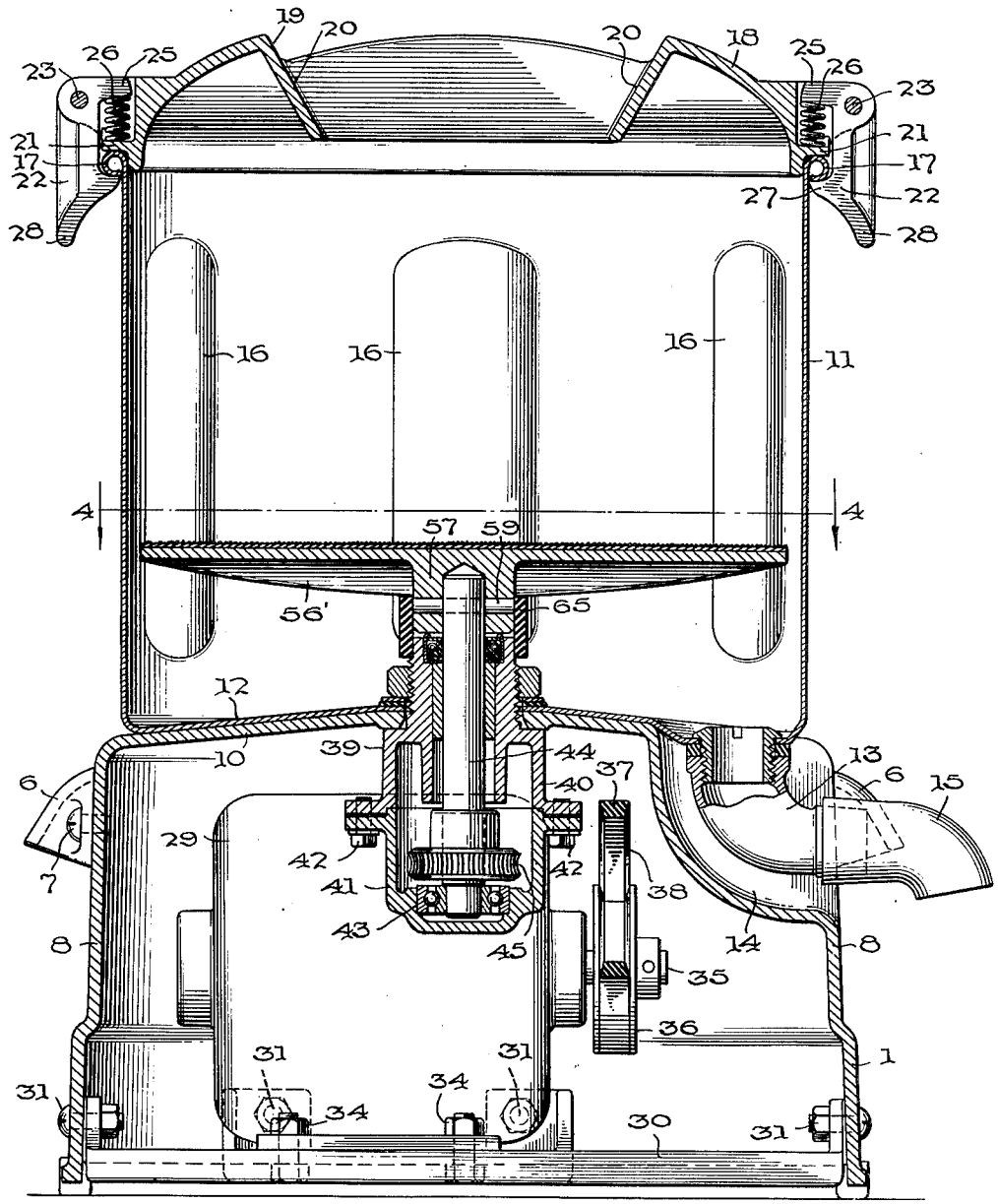
Figure 2 is a vertical sectional view taken on the line 2—2 of Figure 1.
Figure 3:
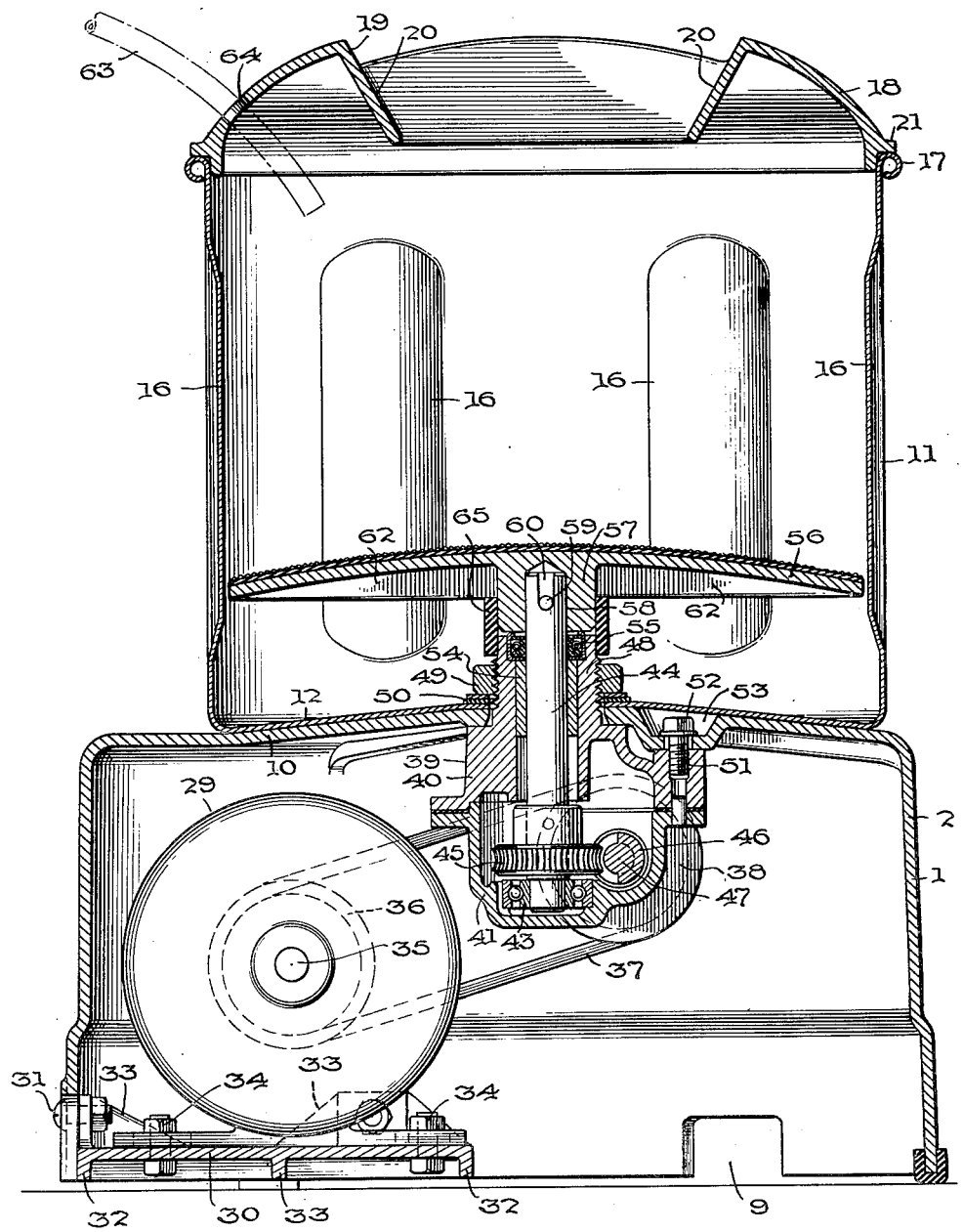
Figure 3 is another vertical sectional view taken on the line 3—3 of Figure 1 at right angles to the section of Figure 2.

The upper wall 10 of the base 1 is preferably arched throughout a circular area having its center coinciding with the center 3 above referred to, so that the upper side of the wall 10 assumes a convex form as will be more particularly understood from reference to Figures 2 and 3 of the drawings. Mounted upon the convex wall 10 of the base 1 is a receptacle 11 which is generally circular in form, with its bottom wall 12 correspondingly arched to provide a concave bottom face which seats flat upon the upper convex surface of the wall 10. Suitably connected to the bottom wall 12 of the receptacle 11, near the outer periphery thereof and communicating with an opening formed in the wall 12, is a coupling 13 which leads from the bottom of the receptacle to one side of the base 1 so as to provide a convenient drain for the receptacle 11, which is self-draining by reason of the convex shape of the bottom wall 12 of the receptacle. The coupling 13 is preferably recessed in the base 1, as indicated at 14, and a rubber hose or nozzle 15 is preferably removably attached to the outer end of the coupling 13, as by means of a slip or friction fit, or otherwise, so as to permit removal of the hose or nozzle to conserve space during shipment, storage, or when the machine is otherwise not in use.

At spaced intervals about the receptacle 11, the vertical wall of the receptacle is indented so as to provide a plurality of inwardly protruding, smoothly curved surfaces of substantial vertical height, as indicated at 16. These inwardly extended protrusions 16 are each of substantial width, and extend from a point near the upper end of the receptacle to a point near the lower end thereof, as clearly shown in Figures 2 and 3.

The purpose of the protrusions will be more fully explained as the description herein proceeds.

The upper edge of the receptacle 11 is preferably rolled outwardly to form an annular bead 17 extending completely around the receptacle. Removably seated upon the upper end of the receptacle 11 is an arched or dome-shaped cover 18 which is formed centrally thereof with an opening 19, preferably rectangular in shape, the marginal walls of the opening 19 being inclined downwardly and inwardly as at 20 to assume the form of a downwardly tapered hopper which facilitates the introduction of the vegetables to be peeled into the receptacle 11 without removal of the cover 18, if desired, although if preferred, the cover 18 can be removed from the upper end of the receptacle for the purpose of introducing the vegetables into the same. In any case, when the cover is in place, the hopper-like walls 20 minimize any tendency for the vegetables to jump or bounce out of the receptacle 11 during the peeling operation hereinafter described.

As shown in Figures 2 and 3, the extreme lower edge of the cover 18 fits freely within the bead 17 about the upper edge of the receptacle 11, and somewhat above the extreme lower edge of the cover, the cover is provided with an annular horizonal flange 21 which rests upon the upper edge of the bead 17 when the cover is placed upon the receptacle. In order to prevent accidental displacement of the cover 18 by the pressure or impacts of the vegetables during the peeling operation, the cover is preferably provided with a pair of spring-pressed latches 22, 22 which serve to positively lock the cover in place on the receptacle, the latches being pivotally connected to the cover by means of pins 23 extended through the respective latches and through laterally spaced ears or bosses 24 disposed at diametrically opposite points on the upper side of the cover 18 and preferably integrally formed with the cover which may be made of a metal casting. Each latch member 22 is provided with a radially offset tail 25 which engages the upper end of a coil spring 26 disposed between the ears or bosses 24, with the lower end of the spring resting upon the flange 21, so that the spring normally tends to urge the latch into locking engagement with the bead 17 on the receptacle 11 when the cover 18 is placed upon the receptacle and pressed downwardly so as to fully seat upon the bead 17. Each latch is also provided with a tongue or nose 27 to engage beneath the bead 17, and also with an outwardly curved handle or grip 28 which may be conveniently grasped by the fingers of the hand to swing the latch outward when it is desired to disengage the latch from the bead 17 for purposes of removal of the cover 18.

Mounted within the base 1 is an electric motor or other prime mover 29 which is supported upon a base plate or shelf 30 extended transversely across the lower end of the base from side to side thereof, and suitably fastened to the base 1, as by means of bolts 31. The base plate 30 may also have the form of a metal casting which is appropriately reinforced or strengthened by marginal flanges 32 and ribs and webs 33, and the motor 29 is suitably secured to the base plate as by means of bolts 34.

The drive shaft 35 of the motor has fixed thereto a pulley 36 which is connected by a V belt or other flexible driving connection 37 to a pulley 38 which drives an appropriate power transmission unit or speed reducer generally designated 39.

The transmission unit 39 preferably has the form of a two-part housing or casing, the upper portion of which is designated 40, and the lower portion 41, the two sections of the casing being connected together as by means of bolts 42. Disposed in a recess in the bottom of the casing section 41 is an oilless thrust bearing 43 which is preferably of the type commercially known as an "Oil-ite" bearing. Journaled in the bearing 43 is a vertical shaft 44 on which is fixed a worm gear 45 which meshes with a worm 46 which is fixed on a countershaft 47 which extends to the outside of the casing or housing of the transmission unit 39. The pulley 38 is fixed on to the outer end of the countershaft 47, so that when the pulley 38 is driven by the motor 29, rotation will be imparted to the vertical shaft 44 in an obvious manner.

Extended upwardly from the upper side of the housing or casing of the transmission unit 39 is an exteriorly threaded collar or sleeve 48 which snugly fits in and projects through an opening formed concentric with the center 3 in the upper curved wall 10 of the base 1, as well as through a corresponding coinciding opening formed in the bottom wall 12 of the receptacle 11. A clamping nut 49 is threaded onto the sleeve or collar 48 and serves to not only draw the transmission unit 39 tightly up against the under side of the upper wall 10 of the base 1, but also to positively and firmly attach and clamp the receptacle 11 to the base 1. Suitable washers or gaskets 50 are preferably interposed between the clamping nut 49 and the upper side of the bottom wall 12 of the receptacle 11 to prevent any leakage around the collar or sleeve 48 of the transmission unit 39. In order to prevent accidental angular displacement of the transmission unit 39, and to insure alignment of the driving pulleys when the transmission unit is clamped in position by the nut 49, a separate bolt 51 is extended through the upper wall 10 of the base 1, into one side of the housing or casing of the transmission unit, the head 52 of the bolt 51 being recessed in a depression or recess 53 formed in the upper wall 10 of the base 1.

The vertical shaft 44 is of such length as to extend upwardly into the receptacle 11 for a substantial distance, and in order to support the upper end of the shaft, a sleeve bearing 54 is preferably disposed within the collar or sleeve 48, together with a seal or packing 55.

Mounted on the upper end of the vertical shaft 44, and disposed within the receptacle 11 at a distance somewhat above the bottom of the latter, is a generally circular disc as indicated at 56. The disc preferably has the form of a metal casting which is provided on its lower side with a hub 57 having a counterbore 58 therein to slidingly receive the upper end of the shaft 44. Diametrically extended through the hub is a pin 59 which is adapted to be received in a diametrically extended slot 60 formed in the upper end of the shaft 44, the slot 60 opening in an upward direction so as to permit easy removal of the disc 56 from the shaft 44, when desired. When the pin is seated in the slot 59, the disc 56 is interlocked with the shaft 44 for rotation therewith. In order to facilitate application of the disc 56 onto the shaft 44, as well as removal of the disc from the shaft, the disc is provided with a plurality of apertures 61, 61 which may be engaged by the fingers of the operator's hand in an obvious manner.

As will be best observed from reference to Figures 2 and 3 of the drawings, the disc 56 is arched in one direction so that it curves downwardly at opposite sides of the diametrical center of the disc, as represented at 56', while the lower side of the disc is provided with a diametrically extended rib 62 which is arranged at right angles to the curved surface of the disc, thereby subtending the arc of the curved surface.

The upper surface of the disc 56 carries an abrasive which may be applied thereto in any of several ways. However, I have found that one of the simplest and easiest ways of applying the abrasive to the disc is by means of the use of abrasive sheets commercially known in the trade as fiber backed synthetic silica grit. Such sheets may be permanently attached to the disc 56 by a suitable waterproof adhesive, such as rubber cement, the adhesive being subjected to heat on the order of 350° F. for approximately one-half hour, until set. Pressure is preferably applied to the sheet during setting of the adhesive so as to insure uniform and intimate contact thereof throughout the upper surface of the disc 56. For practical purposes of general use, I have found that grit sizes varying from #16 to #24, as commercially known to the trade, are eminently satisfactory for purposes of the present invention, but it is to be understood that other grit sizes may be used if preferred, depending upon the nature and type of vegetable to be peeled. Moreover, the invention is not confined to the application of the abrasive to the disc 56 by means of abrasive sheets, since other forms of abrasive application may be employed when desired.

In the use of my new peeler machine, the potatoes or other root vegetables are deposited in the receptacle 11, either through the hopper-like opening 19 in the cover 18, or by first removing the cover and thereafter replacing the cover upon the receptacle after the vegetables have been introduced into the receptacle. The abrasive disc 56 may either be rotating at the time of introduction of the vegetables into the receptacle, or the disc may be set into motion after the vegetables have been introduced, as by energizing the motor 29 which preferably is of sufficient capacity to start up under full load without damage or undue heating of the motor. For practical purposes, I have found that a disc speed of 315 R. P. M. is quite satisfactory, but it is to be understood that I do not wish to be limited to any specific speed of rotation of the disc.

As the disc 56 rotates, the vegetables in the receptacle will be constantly jiggled or shuffled in an upward and downward direction due to the arched shape of the disc, while at the same time, the indentations 16 in the vertical wall of the receptacle 11, protruding slightly into the interior of the receptacle, will produce a still further lateral or radial jiggling or shuffling action to the vegetables. These jiggling or shuffling motions, occurring simultaneously, will cause a continuous agitation and re-distribution of the vegetables within the receptacle so as to bring all of the vegetables into contact with the abrasive on the upper surface of the disc 56, thereby insuring the uniform peeling action with a minimum of flattening or waste of the vegetables, irrespective of their original shape and/or size. As a consequence, the entire load of vegetables will be peeled evenly and completely in a minimum of time by the abrasive action of the abrasive surface of the disc 56.

At the beginning of the peeling operation, and continuing to the end of the peeling operation, water is preferably sprayed or otherwise admitted in a small stream into the receptacle, as by means of a small hose or tube 63 which is adapted to be removably fitted snugly into an opening 64 in the cover 18, as best shown in Figure 3 of the drawings. The water will thoroughly wash the vegetables as they are peeled and will carry off the peelings as they are progressively removed from the vegetables, the water and peelings falling downwardly around the outer margin of the abrasive disc 56 and through the finger openings 61, into the bottom of the receptacle, where they will automatically and completely drain out of the receptacle through the drain opening to which the coupling 13 and discharge tube or nozzle 15 are connected. Due to the minute size of the peelings as they are removed from the vegetables by the abrasive action of the disc 56, they may be readily discharged as waste, along with the water, without danger of clogging the waste line.

In order to minimize any tendency of the peelings and water to pass downwardly along the shaft 44 into the transmission unit 39, a flexible resilient sleeve 65, which may be made of rubber, is snugly fitted about the lower end of the hub 57 of the disc 56, and also snugly fits about the upper end of the sleeve or collar 48 of the transmission unit, but is free to rotate about the latter as the disc 56 turns.

The construction and operation of the invention will be clearly apparent from the foregoing description, taken in conjunction with the illustrations in the drawings, and it will be obvious that the machine is composed of relatively few parts of simple and inexpensive form, and which may be easily assembled. The peeling action has been found to be exceptionally efficient and economical, as has been proven by exhaustive tests. Due to the elimination of sharp corners within the receptacle 11, the machine may be kept sanitary at all times with a minimum of effort, and will give many years of service without undue wear or repair, under ordinary conditions. When made in a size having a capacity of approximately twelve pounds of potatoes, which would ordinarily be the size for a small restaurant or other comparable use, my peeling machine will peel the full load in approximately one and one-half minutes, or the equivalent of one bushel in approximately seven and one-half minutes. Complete and uniform peeling is assured with negligible waste and without flattening of any of the individual potatoes or other vegetables, which is something not heretofore attainable in the use of existing machines.

While the specific details have been herein shown and described, the invention is not confined thereto as changes and alterations may be made without departing from the spirit thereof as defined in the appended claims.

I claim:

1. A peeling machine of the class described, comprising a receptacle, a rotary abrasive member mounted in said receptacle adjacent to the bottom thereof, said receptacle having a plurality of spaced indentations of substantial vertical height and width formed in the peripheral wall thereof, with the indentations smoothly curving inwardly and protruding into the interior of the receptacle, and said abrasive member having its top surface free of projections and having the form of a generally circular disc curving uniformly downwardly at opposite sides of a diametrical center line extended across the top surface of said disc to the opposite marginal edges thereof, and driving means for imparting rotation to said abrasive member.

2. A peeling machine of the class described, comprising a receptacle, a rotary abrasive member mounted in said receptacle adjacent to the bottom thereof, said abrasive member having its top surface free of projections and having the form of a generally circular disc curving uniformly downwardly at opposite sides of a diametrical center line extended across the top surface of said disc to the opposite marginal edges thereof, and driving means for imparting rotation to said abrasive member.

3. A peeling machine of the class described, comprising a receptacle, a rotary abrasive member mounted in said receptacle adjacent to the bottom thereof, said receptacle having a bottom wall provided with an opening therethrough, a hollow supporting base for said receptacle, said base having a receptacle supporting top wall provided with an opening therethrough in axial alignment with the opening through the bottom wall of said receptacle, the bottom wall of the receptacle and the top wall of the base having complementary upwardly inclined, flat faces extending inwardly from the outer margins thereof towards the central portions thereof for centering the receptacle on the base, said bottom wall of the receptacle having a drain opening adjacent to one marginal edge thereof and leading outwardly from the lowest portion of the receptacle to insure complete drainage thereof, driving means for said abrasive member comprising a power transmission unit disposed within said hollow base, said transmission unit having an exteriorly threaded sleeve extended upwardly through the openings in the base and the receptacle, a clamping nut disposed within said receptacle and threadedly engaging said sleeve for clamping said receptacle, base, and transmission unit together, and said transmission unit also having a vertically extended shaft extending upwardly through said sleeve and into the receptacle, with the upper end of said shaft detachably connected with said abrasive member, and means inter-engaged with said base and said transmission unit for locking said transmission unit against angular displacement within said base.

HARRY PEARLMAN.

REFERENCES CITED

The following references are of record in the file of this patent:

UNITED STATES PATENTS

| Number | Name | Date |
| --- | --- | --- |
| 847,328 | Franklin et al. | Mar. 19, 1907 |
| 1,039,689 | Blakeslee | Oct. 1, 1912 |
| 1,491,435 | Stockel | Apr. 22, 1924 |
| 1,664,304 | McCathron | Mar. 27, 1928 |
| 1,728,846 | Westgaard | Sept. 17, 1929 |
| 1,902,506 | Johnston et al. | Mar. 21, 1933 |
| 2,117,765 | Johnston | May 17, 1938 |
| 2,192,316 | Kellermann | Mar. 5, 1940 |
| 2,234,836 | Vick | Mar. 11, 1941 |
| 2,262,383 | Carlson | Nov. 11, 1941 |

FOREIGN PATENTS

| Number | Country | Date |
| --- | --- | --- |
| 668,114 | Germany | Nov. 26, 1938 |
| 545,497 | Great Britain | May 29, 1942 |